United States Patent
Wang et al.

(10) Patent No.: US 10,425,864 B2
(45) Date of Patent: Sep. 24, 2019

(54) METHODS AND APPARATUSES FOR PROCESSING UE CONTEXT OF UE

(71) Applicant: Samsung Electronics Co., Ltd., Gyeonggi-do (KR)

(72) Inventors: Jun Wang, Beijing (CN); Lixiang Xu, Beijing (CN); Xiaoning Ma, Beijing (CN); Yu Qiu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/550,764

(22) PCT Filed: Feb. 12, 2016

(86) PCT No.: PCT/KR2016/001447
§ 371 (c)(1),
(2) Date: Aug. 11, 2017

(87) PCT Pub. No.: WO2016/129957
PCT Pub. Date: Aug. 18, 2016

(65) Prior Publication Data
US 2018/0035336 A1 Feb. 1, 2018

(30) Foreign Application Priority Data
Feb. 13, 2015 (CN) .......................... 2015 1 0080594

(51) Int. Cl.
*H04W 36/00* (2009.01)
*H04W 8/18* (2009.01)
(Continued)

(52) U.S. Cl.
CPC ......... *H04W 36/0033* (2013.01); *H04W 8/18* (2013.01); *H04W 24/02* (2013.01); *H04W 28/06* (2013.01); *H04W 36/08* (2013.01); *H04W 72/1247* (2013.01); *H04W 92/10* (2013.01); *H04W 36/0083* (2013.01); *H04W 36/20* (2013.01); *H04W 36/22* (2013.01); *H04W 72/048* (2013.01)

(58) Field of Classification Search
CPC . H04W 36/0033; H04W 36/20; H04W 36/22; H04W 72/048; H04W 36/0005; H04W 36/0083; H04W 72/1205
USPC .......................................................... 455/437
See application file for complete search history.

(56) References Cited

U.S. PATENT DOCUMENTS

2012/0127956 A1  5/2012  Wang et al.
2012/0327908 A1* 12/2012  Gupta ............... H04W 36/0011
                                                       370/331
(Continued)

FOREIGN PATENT DOCUMENTS

WO  2012068304 A1  5/2012
WO  2012168135 A1  12/2012
WO  2013126101 A1  8/2013

*Primary Examiner* — Timothy X Pham

(57) ABSTRACT

The present application discloses a method and an apparatus for processing a UE context of a UE. In a specific embodiment of the method, a base station receives the UE context from a UE; and the base station, according to the received UE context, performs at least one of: optimizing a service strategy of the base station, optimizing a scheduling mode of the base station; and optimizing a handover procedure for the UE. The embodiment utilizes the UE context to provide the UE with services more effectively.

13 Claims, 16 Drawing Sheets

LCID index values of MAC head adds context information report (LCID values of an Uplink Shared Channel):

| Index | LCID values |
|---|---|
| 00000 | CCCH (Commom control Channel) |
| 00001-01010 | Identity Of The Logical Channel |
| 01011-11000 | Reserved |
| 11001 | Extended Power Headroom Report |
| 11010 | Power Headroom Report |
| 11011 | C-RNTI (Cell Radio Network Temporary Identity) |
| 11100 | Truncated BSR (Truncated Buffer Status Report) |
| 11101 | Short BSR (Short Buffer Status Report) |
| 11110 | Long BSR (Long Buffer Status Report) |
| 11111 | Padding |

| Index | LCID values |
|---|---|
| 00000 | CCCH (Commom control Channel) |
| 00001-01010 | Identity Of The Logical Channel |
| 01011-11000 | Reserved |
| 11000 | Context Information Report |
| 11001 | Extend Power Headroom Report |
| 11010 | Power Headroom Report |
| 11011 | C-RNTI (Cell Radio Network Temporary Identity) |
| 11100 | Truncated BSR (Truncated Buffer Status Report) |
| 11101 | Short BSR (Short Buffer Status Report) |
| 11110 | Long BSR (Long Buffer Status Report) |
| 11111 | Padding |

(51) Int. Cl.
  _H04W 24/02_  (2009.01)
  _H04W 28/06_  (2009.01)
  _H04W 36/08_  (2009.01)
  _H04W 92/10_  (2009.01)
  _H04W 72/12_  (2009.01)
  _H04W 36/20_  (2009.01)
  _H04W 36/22_  (2009.01)
  _H04W 72/04_  (2009.01)

(56) References Cited

U.S. PATENT DOCUMENTS

| | | | |
|---|---|---|---|
| 2013/0044730 A1 | 2/2013 | Qian et al. | |
| 2013/0227078 A1 | 8/2013 | Wei et al. | |
| 2013/0242941 A1* | 9/2013 | Ebesu | H04W 36/245 370/331 |
| 2014/0098778 A1 | 4/2014 | Valentin et al. | |
| 2014/0106770 A1* | 4/2014 | Valentin | H04W 4/001 455/452.1 |
| 2014/0206360 A1 | 7/2014 | Wegmann et al. | |
| 2015/0038143 A1* | 2/2015 | Kilpatrick, II | H04W 64/00 455/436 |
| 2015/0312815 A1* | 10/2015 | Wanstedt | H04W 36/0077 455/436 |
| 2015/0319748 A1* | 11/2015 | Huang | H04W 36/0033 370/329 |
| 2016/0007243 A1* | 1/2016 | Park | H04W 36/0033 370/331 |
| 2016/0242059 A1* | 8/2016 | Lopes | H04W 24/02 |

\* cited by examiner

FIG. 3A

```
-- ASN1START

ActivityState ::=           ENUMERATED {
                                background,foreground }

ActivityState-IEs ::=       SEQUENCE {
    activityState               ActivityState,
    durationTime                INTEGER(0.. 10),
    nonCriticalExtension        SEQUENCE {}                      OPTIONAL
}

RequestType ::=             ENUMERATED {
                                caching,processImmediately}

CapabilityContext-IEs ::=   SEQUENCE {
    screenResolution            ScreenResolution                 OPTIONAL,
    nonCriticalExtension     SEQUENCE {}                         OPTIONAL
}

ScreenResolution ::=        ENUMERATED {
                                qvga, hvga, vga, wvga,fwvga,qhd,hd,fhd,...}

ContextInformation-IEs ::=  SEQUENCE {
    criticalExtensions          CHOICE {
        activityState               ActivityState-IEs,
        preferenceRank              INTEGER(-10.. 10),
        screenSaver                 BOOLEAN,
        requestType                 RequestType                  OPTIONAL,
        capabilityContext           CapabilityContext-IEs        OPTIONAL,
        capabilityContext           CapabilityContext-IEs        OPTIONAL,
        nonCriticalExtension        SEQUENCE {}                  OPTIONAL
    }
}

-- ASN1STOP
```

FIG. 3B

```
-- ASN1START

ContextReport ::=              SEQUENCE {
    criticalExtensions              CHOICE {
        contextInformation          ContextInformation-IEs      OPTIONAL,
        locationInfo-r10            LocationInfo-r10            OPTIONAL,
        mobilityHistoryReport-r12   MobilityHistoryReport-r12   OPTIONAL,
        nonCriticalExtension        SEQUENCE {}                 OPTIONAL
    }
}

-- ASN1STOP
-- ASN1START

UL-DCCH-Message ::= SEQUENCE {
    message              UL-DCCH-MessageType
}

UL-DCCH-MessageType ::= CHOICE {
    c1                         CHOICE {
        ...
    contextReport
        ...
    }
    ...
}

-- ASN1STOP
```

FIG. 4

```
-- ASN1START

RRCConnectionRequest ::=    SEQUENCE {
    criticalExtensions          CHOICE {
        rrcConnectionRequest-r8     RRCConnectionRequest-r8-IEs,
        contextInformation          ContextInformation-IEs          OPTIONAL,
        criticalExtensionsFuture    SEQUENCE {}
    }
}

-- ASN1STOP
```

FIG. 5A

LCID Index values of MAC head adds context information report (LCID values of an Uplink Shared Channel):

| Index | LCID values |
|---|---|
| 00000 | CCCH (Commom control Channel) |
| 00001-01010 | Identity Of The Logical Channel |
| 01011-11000 | Reserved |
| 11001 | Extended Power Headroom Report |
| 11010 | Power Headroom Report |
| 11011 | C-RNTI (Cell Radio Network Temporary Identity) |
| 11100 | Truncated BSR (Truncated Buffer Status Report) |
| 11101 | Short BSR (Short Buffer Status Report) |
| 11110 | Long BSR (Long Buffer Status Report) |
| 11111 | Padding |

| Index | LCID values |
|---|---|
| 00000 | CCCH (Commom control Channel) |
| 00001-01010 | Identity Of The Logical Channel |
| 01011-11000 | Reserved |
| 11000 | Context Information Report |
| 11001 | Extend Power Headroom Report |
| 11010 | Power Headroom Report |
| 11011 | C-RNTI (Cell Radio Network Temporary Identity) |
| 11100 | Truncated BSR (Truncated Buffer Status Report) |
| 11101 | Short BSR (Short Buffer Status Report) |
| 11110 | Long BSR (Long Buffer Status Report) |
| 11111 | Padding |

FIG. 5B

Newly-added : MAC CE for context information report

| Ss | Rt | Sr | | Act | Oct 1 |
| Act | | Rank | | | Oct 2 |

- Ss :  1bit, screen state, 1-screen active state; 0-screen protection state
- Rt :  1bit, traffic request type, 1-immediately processing; 0-delay processing
- Sr :  4bit, screen resolution, denote respectively : qvga, hvga, vga, wvga, fwvga, qhd, hd, fhd, ...
- Act :  5bit, activity of application, the highest bit, 1-running in foreground; 0-running in background. Low 4bit: current state duration
- Rank :  51bit, user preference rank Attach : the existing screen resolution
qvga : quarter video graphic array, 320*240
hvga : half video graphic array, 480*320
vga : video graphic array, 640*480
wvga : wide video graphic array, 800*480
fwvga : full wide video graphic array, 854*480
qhd : quarter high definition, 960*540
hd : high definition, lager than or equal to 1280*720
fhd : full definition, 1920*1080

FIG. 8
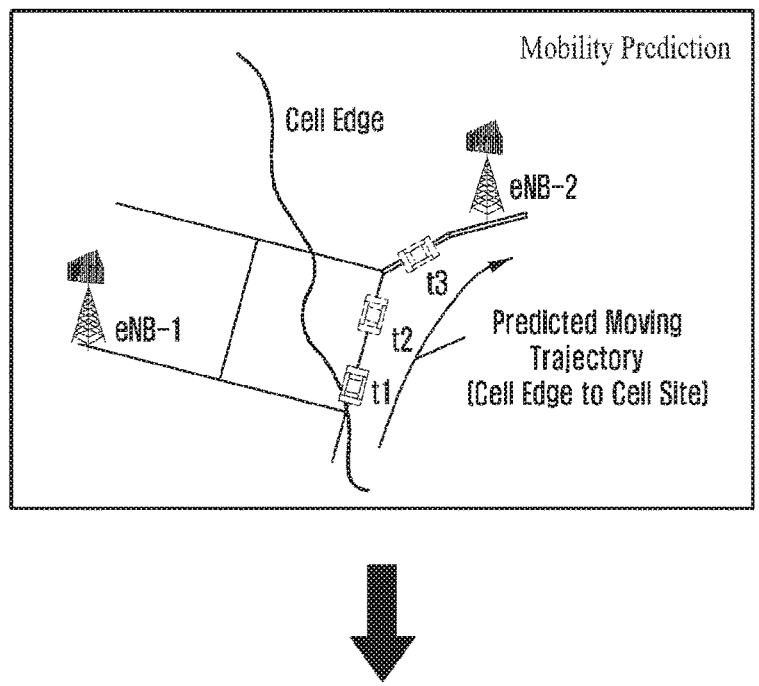
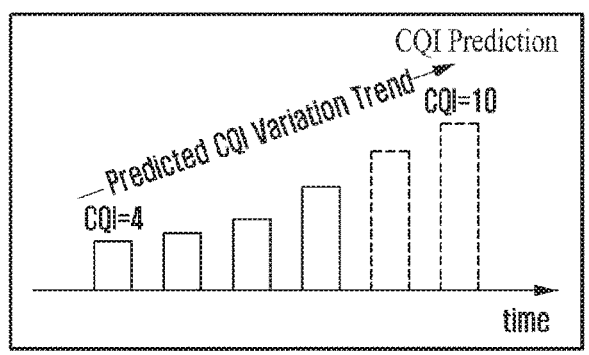
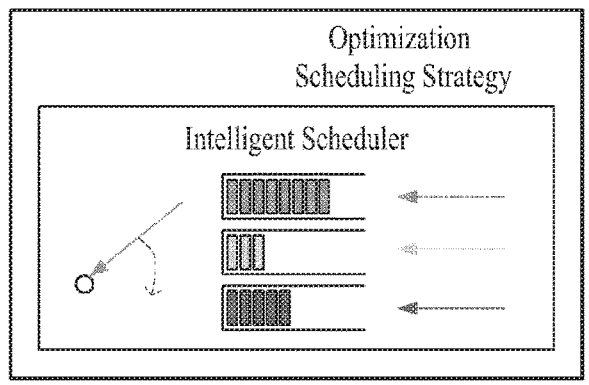

FIG. 10

| UE Context Information | Reporting Approach | Reporting means or timing | Main Usage |
|---|---|---|---|
| UE capability information, screen resolution, and etc | Adding a new RRC information: ContextReport or an enhanced RRCConnectionRequest information or adding a new MAC CE | UE capability information, screen resolution, and etc | Optimization of service strategy |
| Screen Status | | Status changing or according to configuration requirements | Optimization of scheduling mode to improve user experiences |
| Activity of Application | | Periodicity Reporting or status changing | |
| User Preference Rank | | Periodicity Reporting or status changing | |
| Traffic Request Type | an enhanced RRCConnectionRequest information or adding a new MAC CE | Reporting once when a bearer is set up | |
| Location Information(longitude/ latitude/height/velocity) | Adding a new RRC information : ContextReport or adding a new physical layer report | Periodicity Reporting or according to configuration requirements | By predicting, 1)preparing handover context for the UE in advance to reduce handover delay of the UE 2)buffering traffic data for the UE in advance; 3) optimizing a load balance and interference coordination process between base stations or between cells; and 4) Optimizing scheduling mode |
| Mobility History(History Cell and duration) | Adding a new RRC information : ContextReport | Changing or according to configuration requirements | |
| CQI | CQI Report | According to configuration requirements | |

FIG. 11

| Context Item | Description | | Weight | Reference Values | app normalization value ($u_{appj}$) |
|---|---|---|---|---|---|
| Activity of Application | in Foreground | | $W_{appj,1}$ (e.g. 0.4) | min {10, (current time point to the time point switched to the foreground) s} | $V_{appj} = \sum_{i=1}^{n}(V_{appj,i} * W_{appj,i})$, where $\sum_{i=1}^{n} W_{appj,i} = 1$, n represents number (here, 4) of the context participating in optimizing the scheduling i represents number (here, 4) of the context participating in optimizing the scheduling means i represents the context index j represents the application index appj represents the application j $W_{appj,i}$ represents the weight of the i-th context of appj $V_{appj}$ represents the weighted normalization value of appj |
| | in Background | | | min {10, (current time point to the time point switched to the background) s} | |
| User Preference Rank | User Preference Rank | | $W_{appj,2}$ (e.g. 0.3) | e.g. {10, 9, ..., -9, -10} | |
| Traffic Request Type | Immediately Processing | | $W_{appj,3}$ (e.g. 0.2) | e.g. 10 | |
| | Delay Processing | | | e.g. -10 | |
| Screen State | Screen Active State | | $W_{appj,4}$ (e.g. 0.1) | e.g. 10 | |
| | Screen Protection State | | | e.g. -10 | |

FIG. 12

| Traffic Application | Activity of Application | Preference Rank | Traffic Request Type | Screen Status |
|---|---|---|---|---|
| a | Running in foreground, for 8 seconds | Rank first, 10 | Processing immediately, 10 | Screen active state, 10 |
| b | Running in foreground, for 10 seconds | Rank first, 7 | Processing to be postponed, -10 | Screen active state, 10 |

METHODS AND APPARATUSES FOR PROCESSING UE CONTEXT OF UE

CROSS-REFERENCE TO RELATED APPLICATION(S) AND CLAIM OF PRIORITY

The present application claims priority under 35 U.S.C. § 365 to International Patent Application No. PCT/KR2016/001447 filed Feb. 12, 2016, entitled "METHODS AND APPARATUSES FOR PROCESSING UE CONTEXT OF UE", and through Chinese Patent Application No. 201510080594.6 filed on Feb. 13, 2015, each of which are incorporated herein by reference into the present disclosure as if fully set forth herein.

TECHNICAL FIELD

The present application relates to a technical field of communication, particularly, to a technical field of wireless communication, more particularly, to methods and apparatuses for processing user equipment (UE) context of a UE.

BACKGROUND

In the 1990s, Weiser proposed a context-aware technology during the study of the pervasive computing. An object of the pervasive computing is to enable a computer to be aware of changes in the surrounding environment, so as to automatically take actions in accordance with the user's requirements or preset activities.

The context-aware is considered as a supporting technology for the pervasive computing. The context-aware technology enables the computers to perceive and respond to the surrounding environments. To this end, it enables the computers to collect enough information about circumstances via devices connected with them, so that appropriate reactions can be taken based on pre-determined rules.

Herein, "context" refers to information which may be used to describe current situations of an object. Although the context refers initially to location information of the user, in the last few years, the context is not limited to this, and even refers to a part of one process in which the user is involved.

For supporting applications of the context-aware, various dedicated or general-purpose context models have been proposed to select data associated with the applications, so as to improve the precision of information retrieval and take automatically reactions in response to surrounding stimulus.

A context-aware system generally has means of acquisition of the context, abstraction and comprehension of the context, application of the context, and utility evaluation and correction, as shown in FIG. 1. FIG. 1 illustrates a schematic flow chart of the context-aware in the prior art. Generally, there are three methods for acquiring the context as below.

Acquiring Explicitly: directly acquiring context information associated with the users and services by means of physical device awareness, user enquiry, user active setting and the like;

acquiring Implicitly: indirectly acquiring some context information by utilizing the known data or surrounding environments, for example, acquiring the context information regarding time according to interactive logs between the user and the system; and acquiring Inferring: implicitly acquiring some context information which cannot be acquired through acquiring explicitly or implicitly by using statistical methods or data mining technologies.

The abstraction and comprehension of the context refers to analyzing qualitatively and quantitatively various factors impacting the users, impacting means, impacting degrees and their dependent relationships based on the collected context to form an operable model and method.

The application of the context refers to applying effective measures for the system based on the known context and a predicable potential context to provide the users with personalized services.

The utility evaluation and correction refers to evaluating effects of the application of context-aware by adopting suitable utility evaluation indexes, and finding problems based on the evaluated result to perform adaptive improvements.

Introducing the context-aware technology into the wireless communication field will endow new abilities for mobile applications. Currently, in a Long Term Evolution (LTE) system, there are preliminary awareness and applications for some context of a user equipment (UE), such as location information of the UE, a core network for positioning the users, billing, selecting Serving Gate way (SGW) and performing a Minimization of Drive Tests (MDT); and a Channel Quality Indicator (CQI) and a Buffer Status Report (BSR) reported by the UE to a base station as important parameters for allocating radio resources of uplink and downlink.

SUMMARY

In order to provide the users with more personalized and intelligent services and qualified experiences, it should be considered whether the existing UE context information can be further utilized, which context information of the UE can be aware and utilized by a base station, what specific approaches and means can be adopted for reporting the UE context information to the base station, and how the base station utilizes the obtained UE context effectively, and these issues have not yet been solved in the prior art.

In a first aspect, the present application provides a processing method comprising: receiving, by a base station, the UE context from the UE; performing, by the base station according to the received UE context, at least one of optimizing a service strategy of the base station; optimizing a scheduling mode of the base station; and optimizing a handover procedure for the UE.

In some embodiments, the step of optimizing the service strategy comprises: acquiring equipment-relevant information in the UE context; and providing the UE with services corresponding to the equipment-relevant information.

In some embodiments, the equipment-relevant information comprises screen resolution information; and the providing comprises: providing the UE with an air interface radio resource corresponding to the screen resolution of the UE.

In some embodiments, the optimizing the service strategy comprises: acquiring location-relevant information in the UE context; predicting, according to the acquired location-relevant information, a location where the UE will be located; and performing, according to a predicated result, at least one of buffering traffic data for the UE in advance, and optimizing a load balance and an interference coordination process between base stations or between cells.

In some embodiments, the optimizing the scheduling mode comprises: acquiring UE status information in the UE context; and adjusting a scheduling priority of the UE according to the acquired UE status information.

In some embodiments, UE status in the UE status information is a screen active state or a screen inactive state; and the adjusting the scheduling priority further comprises: increasing the scheduling priority of the UE, if the UE is in the screen active state; or decreasing the scheduling priority of the UE, if the UE is in the screen inactive state.

In some embodiments, the optimizing the scheduling mode further comprises: acquiring application-relevant information in the UE context; and adjusting the scheduling priority of an application of the UE according to the acquired application-relevant information.

In some embodiments, the application-relevant information comprises at least one of: activity information on the application, user preference rank information on the application, traffic request type information on the application and screen status information on the application in the UE.

In some embodiments, the optimizing the scheduling mode comprises: acquiring location-relevant information in the UE context; predicting a changing Channel Quality Indicator (CQI) trend of the UE according to the acquired location-relevant information; and adjusting a scheduling priority of the UE according to a predicated result.

In some embodiments, the adjusting the scheduling priority of the UE according to the predicated result comprises: increasing the scheduling priority of the UE, if the predicated result indicates the CQI trend to become worse; or decreasing the scheduling priority of the UE, if the predicated result indicates the CQI trend to become better.

In some embodiments, the optimizing the handover procedure of the UE comprises: acquiring location-relevant information in the UE context; predicating a location where the UE will be located, according to the acquired location-relevant information; and preparing a cell handover context for the UE in advance according to the predicated result.

In some embodiments, the base station receives the UE context by one of: a newly-added radio resource control (RRC) signaling, an enhanced existing RRC signaling, a newly-added MAC control element, and a newly-added physical layer report.

In some embodiments, the receiving the UE context from the UE by the base station comprises: receiving the UE context from the UE by the base station in accordance with a predetermined mode, wherein the predetermined mode comprises at least one of a periodical mode, an event trigger mode, a single event mode and a mode required for configuring the UE by the base station.

In a second aspect, an apparatus for processing a user equipment (UE) context of a UE comprising: a transmitter; a receiver; and a processor, wherein, the receiver is configured to receive the UE context from the UE; and the processor is configured to control, according to the received UE context, the receiver and the transmitter to optimize at least one of: a service strategy of a base station, a scheduling mode of the base station, and a handover procedure for the UE.

In some embodiments, for optimizing the service strategy of the base station according to the UE context, the processor is further configured to: acquire equipment-relevant information in the UE context; and provide the UE with services corresponding to the acquired equipment-relevant information.

In some embodiments, for optimizing the service strategy of the base station according to the UE context, the processor is further configured to: acquire location-relevant information in the UE context; predict a location where the UE will be located according to the acquired location-relevant information; and perform at least one of buffering traffic data for the UE in advance and optimizing a load balance and an interference coordination process between base stations or between cells, according to a predicated result.

In some embodiments, for optimizing the scheduling mode of the base station according to the UE context, the processor is further configured to: acquire UE status information in the UE context; and adjust a scheduling priority of the UE according to the UE status information. In some embodiments, for optimizing the scheduling mode of the base station according to the UE context, the processor is further configured to acquire application-relevant information in the UE context; and adjust the scheduling priority of an application of the UE according to the application-relevant information.

In some embodiments, for optimizing the scheduling mode of the base station according to the UE context, the processor is further configured to acquire location-relevant information of the UE context; predict a changing Channel Quality Indicator (CQI) trend of the UE according to the location-relevant information; and adjust a scheduling priority of the UE according to a predicted result.

In some embodiments, for optimizing the handover procedure of the UE according to the UE context, the processor is further configured to acquire location-relevant information of the UE context; predict a location where the UE will be located according to the location-relevant information; and prepare a cell handover context for the UE in advance according to the predicted result.

The method and apparatus for processing a UE context of a UE provided by the present application receives the UE context from the UE and then optimizes one or more of the service strategies of the base station, the scheduling mode of the base station and the handover procedure of the UE according to the UE context, so as to provide the UE with services more efficiently by utilizing the UE context.

In order to provide the users with more personalized and intelligent services and qualified experiences, the present application provides a method and an apparatus for processing a UE context of a UE.

BRIEF DESCRIPTION OF THE DRAWINGS

Further features, objects and advantages of the present application will be more apparent with a review of a detailed description of the non-limiting embodiments set forth below with reference to the attached drawings.

FIG. 3 illustrates an encoded text diagram of an ASN.1 encoding format of newly-added UE context information elements and RRC signaling according to embodiments of the present application;

FIG. 4 illustrates an encoded text diagram of an ASN.1 encoding format of enhanced existing RRC signaling according to embodiments of the present application;

FIG. 5 illustrates a schematic diagram of a newly-added MAC control element according to embodiments of the present application ;

FIG. 8 illustrates a schematic diagram of example II of optimizing scheduling mode according to embodiments of the present application;

FIG. 10 illustrates a schematic diagram of approaches and means of reporting UE context information to a base station according to embodiments of the present application;

FIG. 11 illustrates a schematic table diagram of the example I of optimizing scheduling mode according to embodiments of the present application;

FIG. 12 illustrates another schematic table diagram of the example I of optimizing scheduling mode according to embodiments of the present application;

DETAILED DESCRIPTION

Hereinafter, the embodiments of the present application will be further explained in detail with reference to the accompanying drawings. It should be understood that specific embodiments described herein only intend to explain the relevant invention, rather than to limit the invention. In addition, it should be noted that only these portions related to the present invention is shown in the accompanying drawings for ease of description.

It should be noted that the embodiments, and features in the embodiments of the present application may be combined unless they conflict with each other. Hereinafter, the present application will be explained in detail with reference to the accompanying drawings in connectivity with the embodiments.

Hereinafter, a base station (BS) is an access apparatus for accessing a communication apparatus to a cellular network and is used to allocate communication resources to the communication apparatus. The base station may be any one entity of an enhanced Node B (eNodeB, abbreviated as eNB), a Node B, a radio access unit, a base station controller, a base transceiver station and etc. The communication apparatus may be any apparatus intended to access to services via access networks and may be configured to communicate through the access networks. For example, the communication apparatus may comprise, but not limit to, a user equipment (UE), a mobile station (MS), a cellular phone, a smart phone, a computer or a multimedia system with communication functions. It should be noted that terms "communication apparatus" "user equipment" and "user terminal" may be used interchangeably hereinafter.

Figure 1:
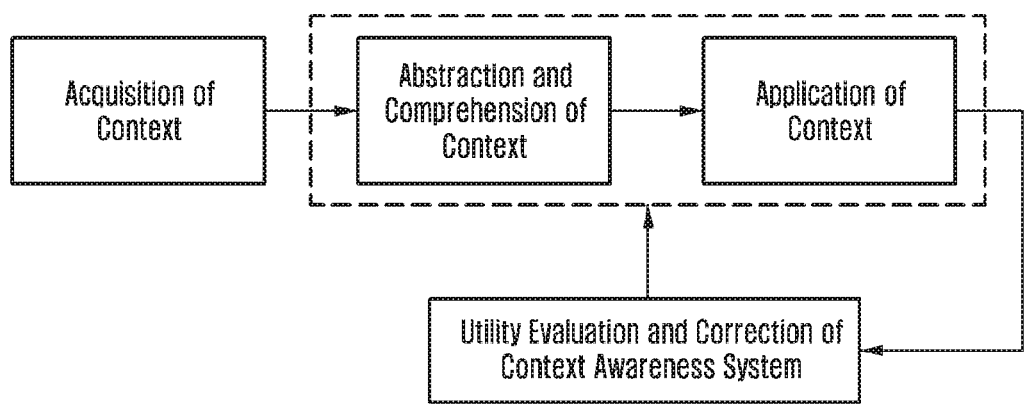
FIG. 1 illustrates a schematic flow chart of a context-aware according to the prior art.
Figure 2:
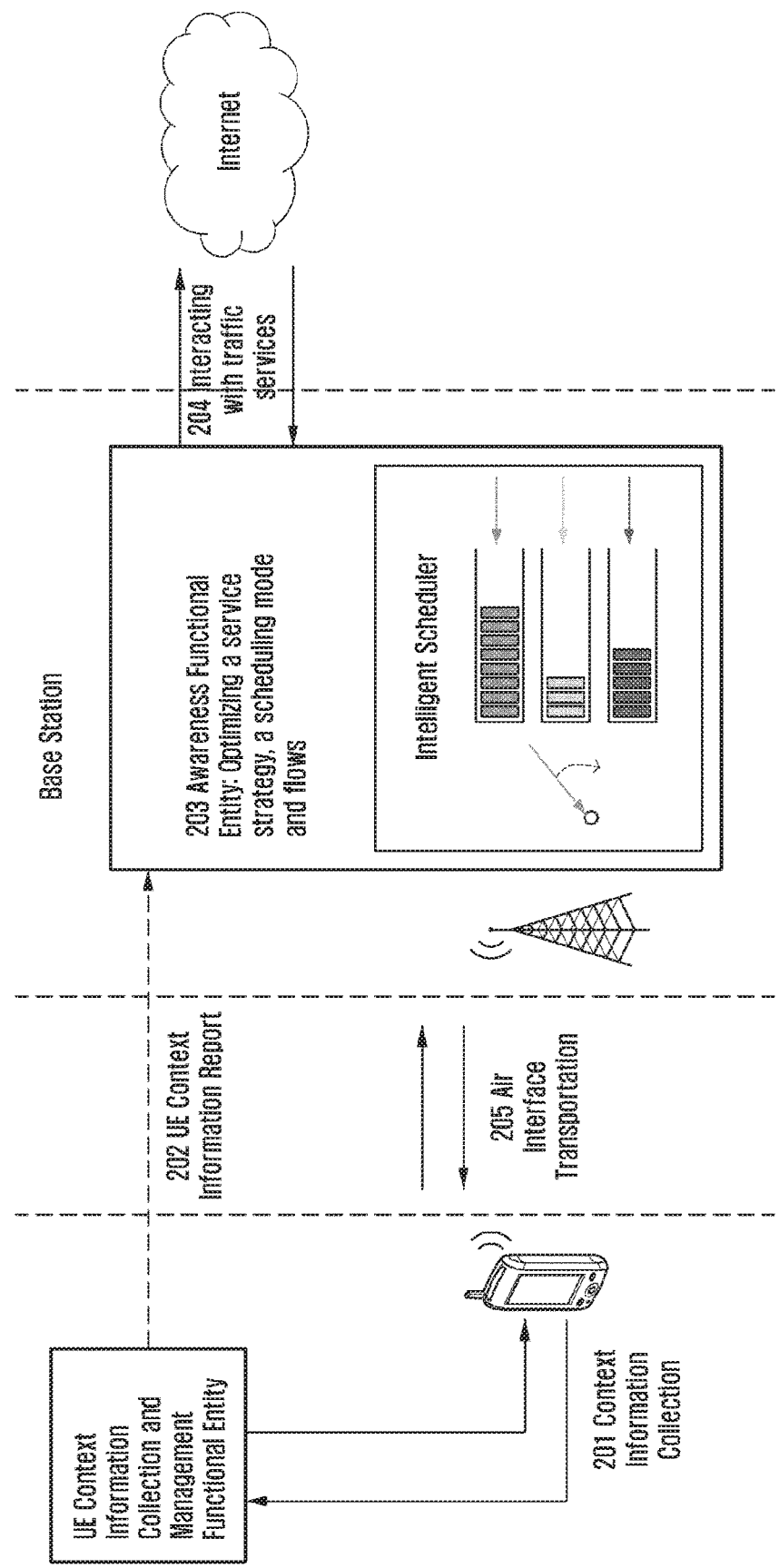
FIG. 2 illustrates a schematic flow chart of a method of UE context awareness and utilization according to embodiments of the present application.

FIG. 2 illustrates a schematic flow chart of a method for UE context awareness and utilization according to embodiments of the present application. The method comprises steps 201 to 205.

In step 201, UE context information is collected.

After the UE is initiated properly, a UE context information collection and management functional entity establishes an interface with a low layer driver, an operating system, a platform middleware and a software, and it acquires the UE context information by periodically detecting a callback function or an interrupting event, or registering the function or event to the low layer, and performing necessary statistics, computation and storage.

For example, the entity acquires activity (activity status) context of the application by the periodical detection (such as, a period of 100ms). When the detection period arrives:

1) acquiring current statuses of all applications from the operating system (i.e., the current activity status, e.g. running in foreground or in background);

2) updating duration time of respective applications in the current statuses, with a unit of the detection period;

3) performing necessary computations and storages; for example, the maximum of the duration time of current status may be limited in be 10 seconds and then is stored so as to reduce transmission length of air interface signaling and a requirement of scheduling mode of the base station; and 4) triggering a report procedure of the UE context, if a UE context information reporting condition is satisfied (for example, a reporting period, such as 500ms, arrives).

In step 202, the UE context information is reported to the base station.

FIG. 10 illustrates a schematic diagram of approaches and means of reporting UE context information to the base station according to embodiments of the present application. Specifically, the aforementioned reporting approaches comprise reporting approaches 1) to 4) as below.

1) Adding a New RRC Signaling

FIG. 3 illustrates an encoded text diagram of an ASN.1 (Abstract Syntax Notation One) encoding format according to embodiments of the present application. As shown in FIG. 3, definitions of respective UE context information elements (IE) are added in an RRC layer. Meanwhile, a context report message ContextReport is added to UL_DCCH_Message information, and contains all UE context IEs which may be reported and may be used to determine whether a particular IE is carried in this report message by an OPTIONAL (optional attribute). For example, the context report message may contain a contextInformation IE without a mobilityHistoryReport-r12 IE, or may contain both of them.

If the UE context information reporting condition is satisfied, contents of the RRC context report message are constructed according to the current UE context information, encoded by ASN.1 and transferred to the low layer, and then transmitted to the base station via the air interface.

2) Enhancing the Existing RRC Signaling

Some UE context information, such as capabilityContext information element containing screen resolution information, can be reported only once, which can be achieved by many methods as below.

2.1) The information element can be reported once by controlling via the OPTIONAL of the capabilityContext information element in the newly-added context report message ContextReport.

2.2) As shown in FIG. 4, in which another encoded text diagram of an ASN.1 encoding format according to embodiments of the present application is shown, the existing RRC signaling may be enhanced, for example, a contextInformation information element with OPTIONAL attribute is added to an RRCConnectionRequest message to report the context information.

3) Adding a New MAC (Media Access Control) Control Element (MAC CE)

One important object of the UE context-aware is to optimize the scheduling mode. As an entity for implementing the scheduling mode, the MAC transmits directly the UE context information by the MAC control element of UE peer layer, which is an effective method.

FIG. 5 illustrates a schematic diagram of values of Logical Channel Identification (LCID) index in a MAC header according to embodiments of the present application. As shown in FIG. 5 and discussed in the corresponding written descriptions, the MAC CE is indentified by a LCID field with 5 bits in the MAC header, and the value of LCID index (11000, binary) of an Uplink Shared Channel (UL-SCH) is used as identification of MAC CE for the UE context information report. Only 2 bytes are defined for the MAC CE for the UE context information report, so as to transmit the UE context information containing screen status, service request type, the screen resolution, activity of applications and user preference rank and the like.

If the UE context information reporting condition is satisfied, according to the current context information, the MAC layer of the UE constructs a MAC PDU (MAC Protocol Data Unit) carrying the MAC CE for the context information report, and passes it to the low layer, and then transmits it to the base station via the air interface.

4) Adding a New Physical Layer Report

For the UE context information with high real-time demand (for example, location information of a high-speed UE), the physical layer of the UE acquires (for example, sharing memory) the UE context information across layers from the context information collection and management functional entity, and transmits the UE context information to the base station by a similar mechanism of CQI reporting via the newly-added physical layer report, so as to achieve real-time awareness and effective utilization.

As shown in FIG. 2, in step 203, the base station is aware of functional entities.

Upon receiving the context information reported by the UE, the base station utilizes the received context information comprehensively and effectively to achieve full range optimization and intelligent services.

Referring again to FIG. 10, FIG. 10 illustrates an example of UE context information utilization in the method provided according to embodiments of the present application which comprises, particularly, types of 1) optimizing a service strategy, 2) optimizing a scheduling mode and 3) optimizing processes as below.

1) Optimizing the Service Strategy

From the above mentioned step 203, the base station is aware that the screen resolution of the UE is high definition (HD, 1280*720), while the user requests a video traffic of full high definition (FHD, 1920*1080). Even if the user obtains the traffic data of FHD, due to limitations of screen hardware capability of the UE, the user can not be provided with video traffic experience with real FHD, instead of occupying more air interface resources. With the method of the present application, when the traffic request of the user is beyond the screen resolution capability of the UE perceived by the base station, the base station interacts with traffic servers by step 204 to provide the UE with the optimal traffic experience adapted to the capability, so that unnecessary waste of time-frequency resources can be avoided. The saved resources can be allocated to other traffic requirements to achieve the sufficient and effective utilization of air interface resources.

Figure 6:
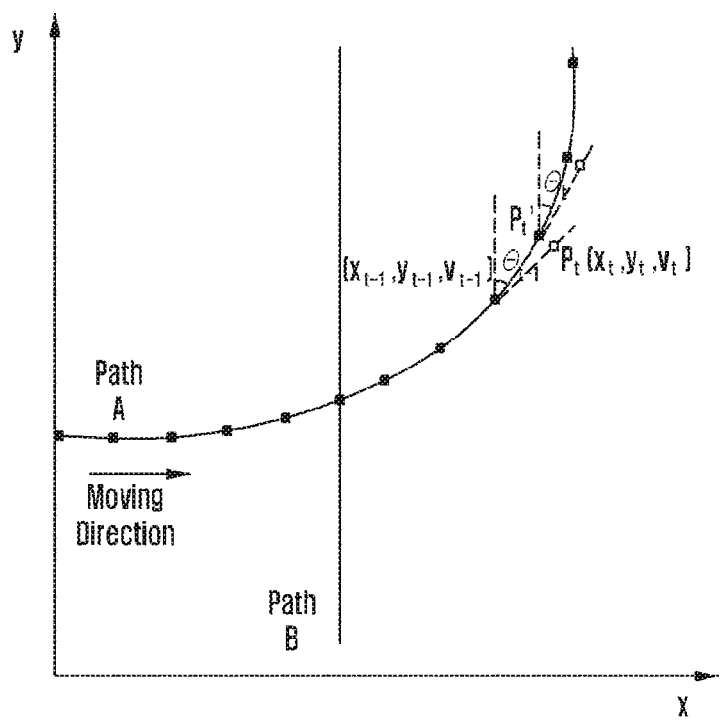
FIG. 6 illustrates a schematic diagram of UE location prediction according to embodiments of the present application.

The base station predicts a mobility velocity, a direction and a location of the UE in the future short time according to the aware information of current latitude, longitude, height, velocity and etc. of the UE and the history activity trails, combining a map matching technology. FIG. 6 illustrates a schematic diagram of effect of predicting the mobility velocity, direction and location of the UE according to embodiments of the present application. Particularly, the steps for predicating comprise the following steps (1) to step (5).

Step (1): Acquiring Topology and Data Information of the Current Map

The base station stores in advance the topology of transportation and the map and the location data information of the serviced cells and the neighboring cells.

Step (2): Acquiring History Location and Velocity Information of the UE

The base station saves the location and velocity information of the UE which are perceived in the latest period as an important basis for predicting the location and velocity of the UE at the next time point. For example, (xt-n, yt-n, vt-n), . . . , (xt-1 ,yt-1, vt-1), (xt, yt, vt), where t represents time point, n represents reference time window length of the history information, x represents the longitude, y represents the latitude and v represents the velocity.

Step (3): Predicating the Mobility Velocity of the UE

Since the velocity is continuous in a time domain, the mobility velocity of the UE may be predicated by using the formula as below:

$$\overline{V}_t = (1-a)*\overline{V}_{t-1} + a*V_{t-1}$$

i.e., $$\overline{V}_t = (1-a)^n*\overline{V}_{t-n} + (1-a)^{n-1}*V_{t-n} + \ldots + a*V_{t-1}$$

where, t represents the time point;

n represents the reference time window length of the history information;

a represents a smoothing factor, ranging from (0, 1) and used for regulating influence degree of the latest velocity and the history velocity to the predication results;

$V_{t-1}$ represents an instantaneous velocity (awareness parameter) at time point t−1; $V_t$ represents the predicated velocity at time point t after being smoothed; and $\overline{V}_{t-n}$ represents the predicated velocity at time point (t−n) after being smoothed.

Step (4): Calculating Quasi Coordinates of the UE at the Next Time Point Angles of the UE between the mobility direction and the y-axis at different time points are shown as $\theta_{t-1}$ and $\theta_t$ in FIG. 6.

The base station calculates the quasi coordinates Pt of the UE at the next time point by utilizing the mobility velocity and the directional angles of the UE in the latest n times via formulas as below:

$$x_i = x_{i-n*\Delta i} + \Delta t * \sum_{k=t-n*\Delta t}^{t-\Delta t} (V_k * \sin\theta_k)$$

$$y_i = y_{i-n*\Delta i} + \Delta t * \sum_{k=t-n*\Delta t}^{t-\Delta t} (V_k * \cos\theta_k)$$

where, t represents the next time point;

n represents numbers of history location information reference points participating in predication of the current location;

$\Delta t$ represents an interval of predication duration;

k represents each time point from t−n*$\Delta t$ to t−$\Delta t$ in time interval of $\Delta t$ $\theta_k$ represents an angle between the mobility direction and y-axis at time point k;

$V_k$ represents the velocity at time point k;

$x_t$ represents the quasi x-coordinate (or longitude) at time pint t; and $y_t$ represents the quasi y-coordinate (or latitude) at time point t.

Step (5): Predicating a Reasonable Location of the UE

By combining of the map topology and the location data information, the calculated quasi coordinate Pt is matched with the nearest reasonable location Pt' in the map as the predicated location coordinate of the UE at the next time point.

According to the current location and the serving cell of UE in combination of neighboring cell information and the predicated location information of the UE, a serving base station with buffering function interacts with the traffic server in step 204, buffers some traffic data for the UE in advance, to provide the mobility UE with seamless traffic experiences. Meanwhile, with cooperation between the base stations or between the cells, processes of the predicable load balance and interference coordination are performed to provide more intelligent radio resource management services.

2) Optimizing Scheduling Mode

Figure 7:
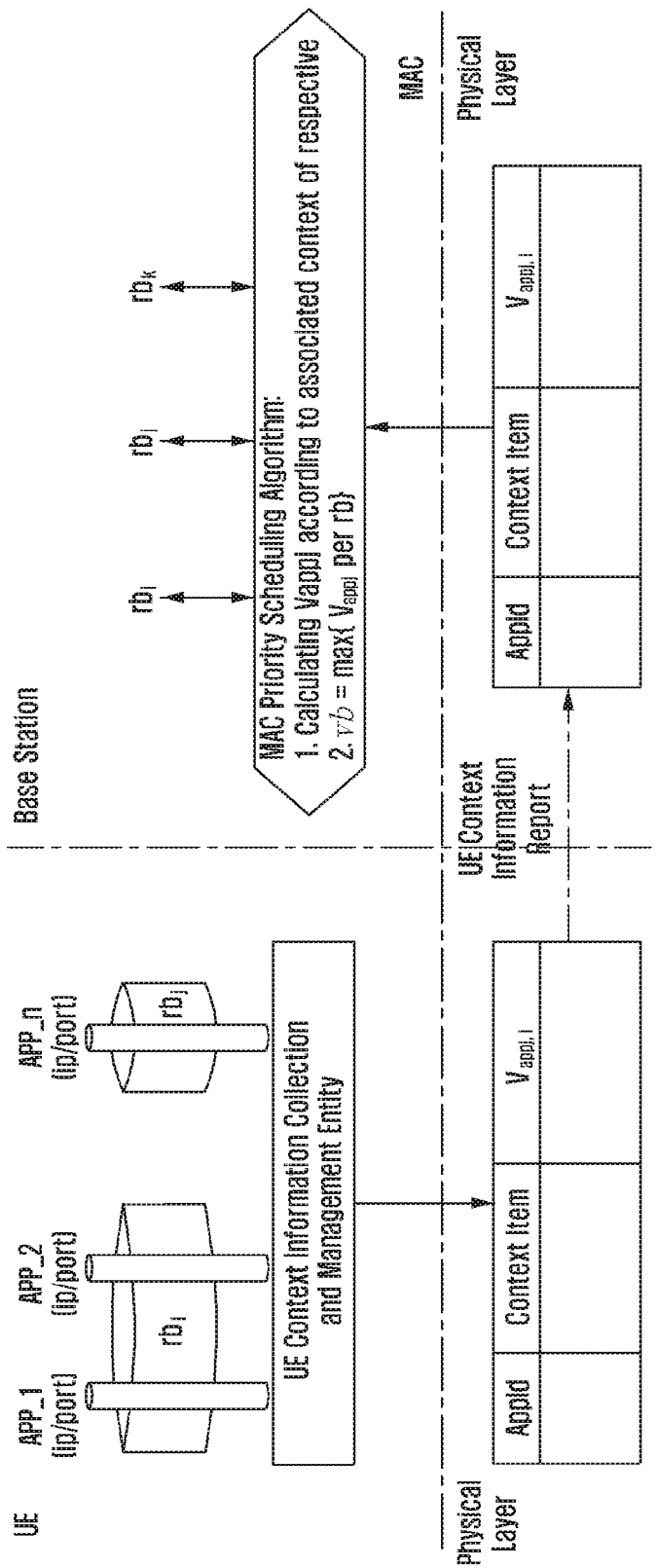
FIG. 7 illustrates a schematic diagram of example I of optimizing scheduling mode according to embodiments of the present application.

Example I of optimizing the scheduling mode in the method provided by the present application can be described by FIGS. 7 and 11. FIG. 7 illustrates a schematic diagram of example I for optimizing the scheduling mode according to the present application, and FIG. 11 illustrates a schematic diagram of a table corresponding to the example I of optimizing scheduling mode shown in FIG. 7 according to embodiments of the present application.

There are many kinds of services and the corresponding applications running in the UE simultaneously, wherein each application has the corresponding context information and corresponding value. After these initial data are reported by the UE to the base station, the base station optimizes the scheduling mode with particularly the following processes (1) to (5).

Process (1): Each context information participating in optimizing the scheduling mode is used as an impacting factor for a scheduling priority and is given a weight according to the impacting degree for the scheduling priority. For example, $W_{appj,1}$ =0.4 denotes the first context information of the application j, and the impacting degree for the scheduling priority is 40% of all context information participating in optimizing the scheduling mode, wherein a sum of weights of all context information is 1. In this embodiment, the weights allocated for the activity of application, the traffic preference rank, the traffic request type, and the screen state are 4:3:2:1.

Common methods for determining weights of the different contexts comprise: questionnaire analysis; expert grading; statistical analysis of user complains; and statistical analysis of signaling.

Process (2): The detailed value of Vappj,i of each context of the traffic application j can be obtained from the contents reported by the UE, where i represents the context index, as shown in FIG. 11. In FIG. 11, the number of the context is 4, and then i ranges from 1 to 4 accordingly.

Process (3): The weighted normalized value $V_{appj}$ of each context information of the traffic application j can be obtained by weighted through the following formula, as the impacting factor of the scheduling priority of traffic application j.

$$V_{appi} = \Sigma_{i=1}^{n}(V_{appj,i} * W_{appj,i})$$

where $\Sigma_{i=1}^{n} W_{appj,i}=1$ n represents the number of the context participating in optimizing the scheduling mode;

i represents the context index;

j represents the application index;

appj represents the application j;

$W_{appj,i}$ represents the weight of the i-th context of appj;

$V_{appj}$ represents the weighted normalization value; and $V_{appj,i}$ represents the corresponding value of each context of appj of the UE.

FIG. 12 illustrates a schematic diagram of another table corresponding to example I of optimizing scheduling mode in FIG. 7 according to embodiments of the present application. As shown in FIG. 12, for traffic application a:

Vapp_ a=0.4*8+0.3*10+0.2*10+0.1*10=9.2.

For traffic application b:

Vapp_ b=0.4*(−10)+0.3*7 +0.2*(−10)+0.1*10=−2.9.

Process (4): In real applications, one radio bearer (rb) may correspond to one or more traffic application, while the scheduling mode therefor are based on a granularity of rb. Therefore, in a scene of one rb corresponding to more traffic applications, the maximum value $V_b$ of each traffic application $V_{appj}$ corresponding to the rb may be used as a value of impacting factor for the scheduling priority, that is, $V_b = \max\{V_{appj} \text{ per rb}\}$.

Process (5): Based on a classical Proportional Fair (PF) algorithm, final scheduling priority of the traffic can be obtained by the following formula.

$$j^* = \arg\max_{j=1,\ldots k}\left\{\exp(vb_j) * \frac{d_j}{R_j}\right\}$$

where, j represents the UE index;

K represents a queue length of the scheduler;

$d_j$ represents an instantaneous throughput of the UE j, with a unit of bps (bit per second);

$R_j$ represents an average throughput of UE j, with a unit of bps (bit per second);

$Vb_j$ represents the impacting factor obtained by calculating via the present method; and j* represents the final UE index selected by the scheduler.

As shown in FIG. 12, in comparison to the classical algorithm of PF, the final priority of traffic application a with the method provided by the present embodiment is increased by $e^{9.2}$ times, and the final priority of traffic application b is decreased to $1/(e^{9.2})$.

FIG. 8 illustrates a schematic diagram of example II for optimizing the scheduling mode according to the method provided by the present application.

The base station utilizes history trails of the UE and the current latitude, longitude, height and the mobility velocity in combination of the map data, neighboring information and history information of CQI report to predict, by similar methods for predicating the mobility velocity, to predict the changing tendency of CQI of the UE in the future short time. For example, if the UE moves from the center to edges of a cell, the base station predicates that the CQI tends to be worse, and thus the eNB may properly increase the scheduling priority of the UE in order to avoid the UE failing to obtain the scheduling resources due to the channel quality being worse gradually; and if the UE moves inversely, then the base station predicts that the CQI tends to be better and the UE will obtain relatively sufficient radio resources, so that the eNB may properly decrease the scheduling priority of the UE and allocates the radio resources to other UEs, thereby the users can be provided with traffic scheduling services more intelligently.

3) Optimizing Processes

Figure 9:
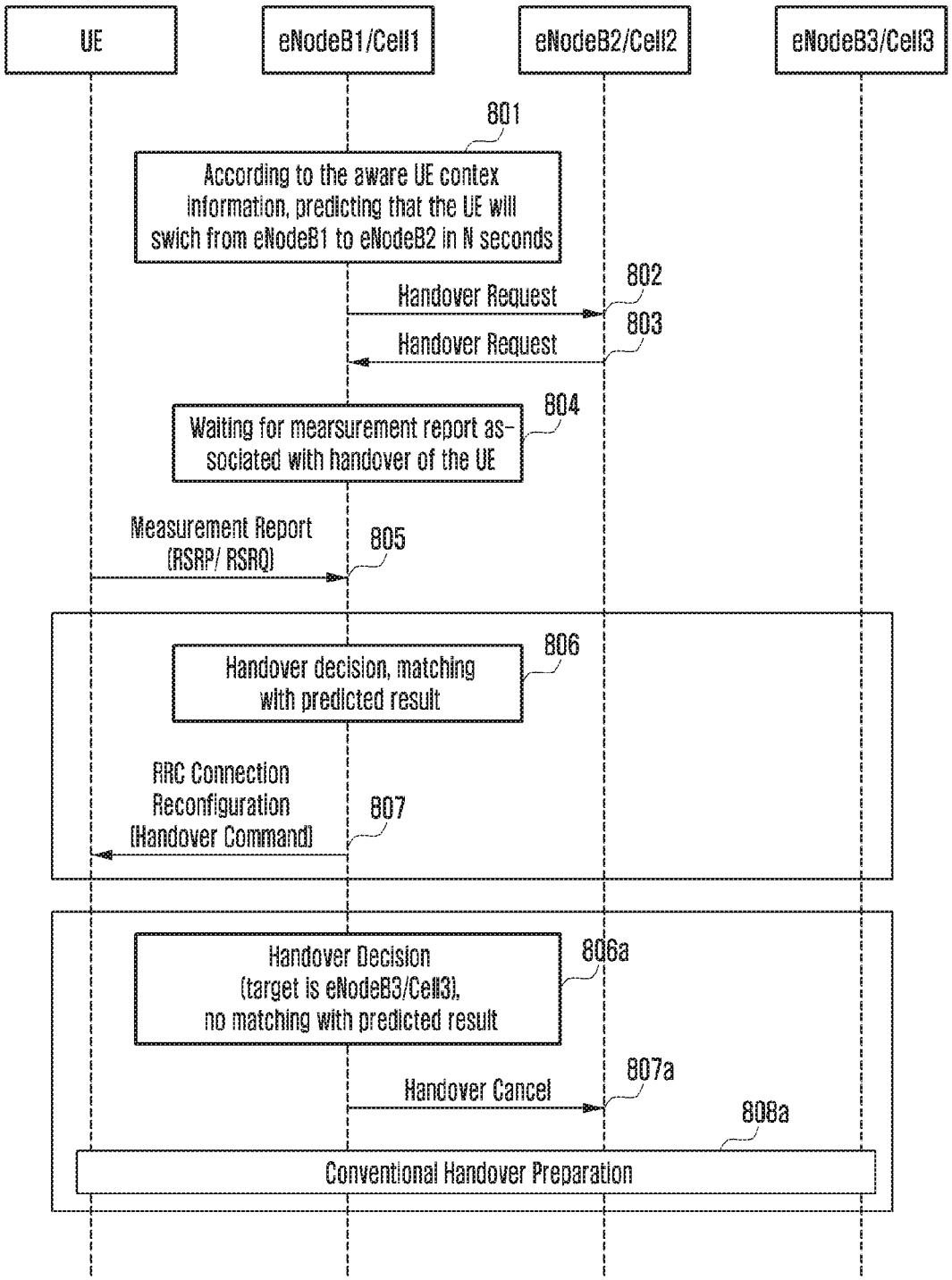
FIG. 9 illustrates a schematic signaling diagram of optimizing handover procedure and reducing handover delay according to embodiments of the present application.

FIG. 9 illustrates a schematic signaling diagram of optimizing the handover procedure and reducing the handover delay in the method provided according to embodiments of the present application.

In particular, in step 801, the eNodeB1/Cell1 predicts that the UE will be switched to the eNodeB2/Cell2 in N seconds according to the UE context information.

In step 802, the eNodeB1/Cell1 transmits a handover request message carrying the UE context information and etc. to the eNodeB2/Cell2 for preparing necessary context handover.

In step 803, the eNodeB2/Cell2 allocates resources for the incoming UE in advance. After completing the handover preparation, the eNodeB2/Cell2 replies a Handover Request ACK to the eNodeB1/Cell1.

In step 804, the eNodeB1/Cell1 is not required to transmit a RRC connection reconfiguration message carrying a Handover Command before receiving a measurement report of the UE within a predicated valid period of N seconds.

In step 805, the eNodeB1/Cell1 receives a measurement report message carrying a Reference Signal Received Power/Reference Signal Received Quality (RSRP/RSRQ) of the serving cell and the neighboring cell of the UE within the predicted valid period of N seconds.

In step 806, the eNodeB1/Cell1 decides the handover according to the measurement report; and if the decision is matched with the predicated result, the eNodeB1/Cell 1 immediately transmits a RRC connection reconfiguration message carrying the Handover Command to the UE.

In step 807, upon receiving the RRC connection reconfiguration message carrying the Handover Command, the UE performs the handover.

During the process, after the UE transmits the measurement report to the base station, the base station only decides whether the handover is matched with the predicted result, skipping the necessary steps 802 and 803 in which the handover command is transmitted to the UE in the conversional handover preparation procedure, so that the handover delay of the UE can be reduced.

In step 806a, the eNodeB1 /Cell1 decides the handover according to the measurement report; if the decision is to switch to the eNodeB3/Cell3 which is not matched with the predicated result, and then the eNodeB 1/Cell1 transmits a handover cancel message to the eNodeB2/Cell2.

In step 807a, upon receiving the handover cancel message, the eNodeB2/Cell2 recollects the pre-allocated resources for the UE and clears the prepared UE context for the handover preparation.

In step 808a, in accordance with the conventional handover procedure, the UE switches from the eNodeB18/Cell1 to the eNodeB3/Cell3.

During the process, the handover procedure of the UE is the same as that in the conventional handover procedure, even if the predicted result has a deviation.

Referring to FIG. 2 again, in step 204, traffic services are interacted with each other.

When the UE requests services or the base station performs optimization process by utilizing the awareness information, the base station needs to interact with a remote traffic server to acquire or buffer traffic data so as to provide the UE with the intelligent network services.

In step 205, transportation via the air interface is performed.

The signaling between the UE and the base station, comprising the UE context information report, the measurement report, the handover command, the RRC connection control, the MAC PDU carrying MAC CE for the context information report are transported via the air interface.

All traffic data between the UE and the base station which have been optimized by the awareness functional entity of the base station is transported via the air interface.

With the aforementioned method, the scheduling mode or the service strategy of the base station can be optimized, the handover procedure of the UE can be optimized, the handover delay of the UE can be reduced, and the load balance and interference coordination between base stations or between cells can be optimized, so that the UE can be provided with services more intelligently to improve user experiences.

Figure 13:
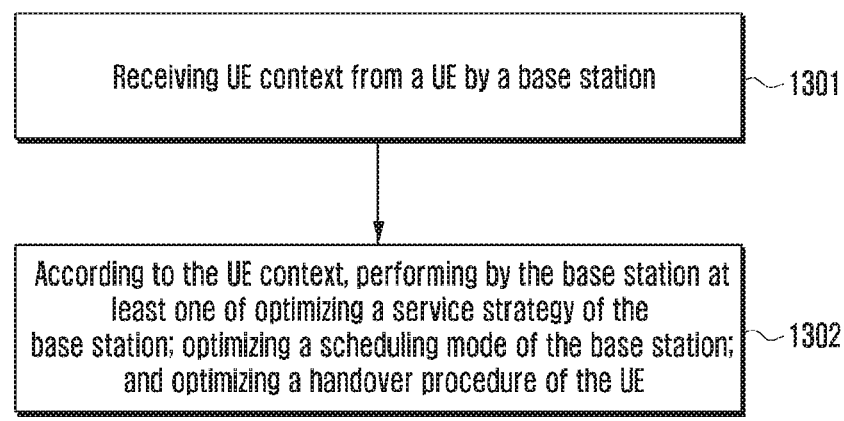
FIG. 13 illustrates an exemplary flow chart of a method for a base station during the UE context processing procedure according to embodiments of the present application.

FIG. 13 illustrates an exemplary flow chart of a method for a base station in the processing procedure of UE context according to embodiments of the present application.

As shown in FIG. 13, in step 1301, the base station receives the UE context from the UE.

In some embodiments, the aforementioned base station may receive the UE context by one of a newly-added RRC signaling, an enhanced existing RRC signaling, a newly-added MAC control element and a newly-added physical layer report. Herein, the aforementioned UE context may be all information associated with the UE.

Alternatively, the UE context may comprise, but not limit to, the UE status information, for example, information regarding the UE being in a screen save state (inactive state) or in an active state; the equipment-relevant information of the UE, for example, UE capability information of the screen resolution and etc.; the activity information of the application, for example, information regarding the application which needs network support running in the foreground or in the background and the duration time; the user preference rank information, that is the preference rank for the application or the traffic determined by a user; the traffic request type information, that is whether the requested traffic needed to be processed immediately or be postponed; the location information, for example, the latitude, the longitude, the height, the mobility velocity, the mobility direction, the mobility direction or the like of the UE; and the mobility history information, for example, the cell identification experienced by the UE during the moving process and the time span of the UE in each cell.

Alternatively, the aforementioned base station may receive the UE context from the UE in accordance with a predetermined mode, wherein the predetermined mode may comprise at least one of a periodic mode, an event trigger mode, a single event mode (for example, the information element containing the screen resolution information is required to be reported only one time) and a mode required for configuring the UE by the base station.

Next, in step 1302, according to the UE context, the base station performs at least one of optimizing the service strategy of the base station, optimizing the scheduling mode of the base station and optimizing handover procedure of the UE.

In some embodiments, the step of optimizing the service strategy of the base station by the base station according to the UE context information comprises: acquiring the equipment-relevant information in the aforementioned UE context; and providing the aforementioned UE with services corresponding to the aforementioned equipment-relevant information. Alternatively, the aforementioned equipment-relevant information may comprise the screen resolution information, and the step of providing the aforementioned UE with services according to the aforementioned equipment-relevant information may comprise providing the aforementioned UE with air interface radio resource corresponding to the screen resolution of the UE. Accordingly, the base station can adjust the service strategy more intelligently based on the UE context information to reasonably utilize radio resources of the air interface. If the traffic request from the user is beyond the equipment capability of the UE, the base station provides the UE with suitable services in combination of the UE context information and avoids unnecessary waste of time-frequency resources of the air interface, and thus the saved resources can be allocated for other traffic requirements.

In some embodiments, the step of optimizing, by the base station, the service strategy of the base station according to the UE context may comprises: firstly, acquiring the location-relevant information of the aforementioned UE context; secondly, predicting a location where the UE will be located according to the aforementioned location-relevant information; and finally, according to the predicted result, performing at least one of buffering traffic data for the UE in advance and optimizing the load balance and the interference coordination process between base stations or between cells. Herein, the aforementioned location-relevant information may comprise the current location-relevant information of the UE and the history location information of the UE. More specifically, the location-relevant information may comprise for example, but not limit to the current or the history latitude, longitude, height, velocity and etc., as well as other location information of the UE which are obtained through network positioning technology. The UE may acquire and record the current location-relevant information and the history location information of the UE (for example, the mobility history information), while the base station may be aware of and store the aforementioned information to form the activity trail of the UE. The base station predicts the location, the velocity, the mobility direction and the changing CQI trend of the UE in the future short time, based on the current location information and the history activity trail of the UE in combination of the map data (streets, railways, shopping malls and etc.), the neighboring cell information and the history information of CQI report. Accordingly, the base station can provide the users with better quality services by utilizing the predicated information.

In some embodiments, the step of the aforementioned optimizing the scheduling mode of the base station by the base station according to the UE context may comprises: acquiring the UE status information of the aforementioned UE context firstly; and then adjusting the scheduling priority of the UE according to the aforementioned UE status information. Alternatively, the UE status of the aforementioned UE status information may be a screen active state or a screen inactive state. Here, the step of adjusting the scheduling priority of the UE according to the aforementioned UE status information comprises: if the UE is in the screen active state, increasing the scheduling priority of the UE; or if the UE is in the screen inactive state, decreasing the scheduling priority of the UE.

In some embodiments, the step of optimizing, by the base station, the scheduling mode of the base station according to the UE context may comprises: acquiring application-relevant information in the aforementioned UE context firstly; and then adjusting the scheduling priority of applications of the UE according to the aforementioned application-relevant information. Alternatively, the aforementioned application-relevant information comprises at least one of an activity information of the application (activity status), a user preference rank information of the application, a traffic request type information of the application and a screen status information of the application in the UE.

In some embodiments, the step of optimizing, by the base station, the scheduling mode of the base station according to the UE context may comprises: acquiring the location-relevant information of the aforementioned UE context firstly; and then predicting a changing CQI trend for the UE according to the location-relevant information; and then adjusting the scheduling priority of the UE according to the predicated result. Alternatively, the step of adjusting the scheduling priority of the UE according to the predicated result comprises: if the predicated result indicates that the aforementioned CQI tends to become worse, increasing the scheduling priority of the UE; or if the predicated result indicates that the aforementioned CQI tends to become better, decreasing the scheduling priority of the UE.

In some embodiments, the aforementioned step of optimizing, by the base station, the handover procedure of UE according to the UE context comprises: acquiring the location-relevant information of the aforementioned UE context firstly; and then predicting a location where the UE will be located according to the aforementioned location-relevant information; and then preparing the handover context of a cell for the UE in advance according to the predicated result.

Figure 14:
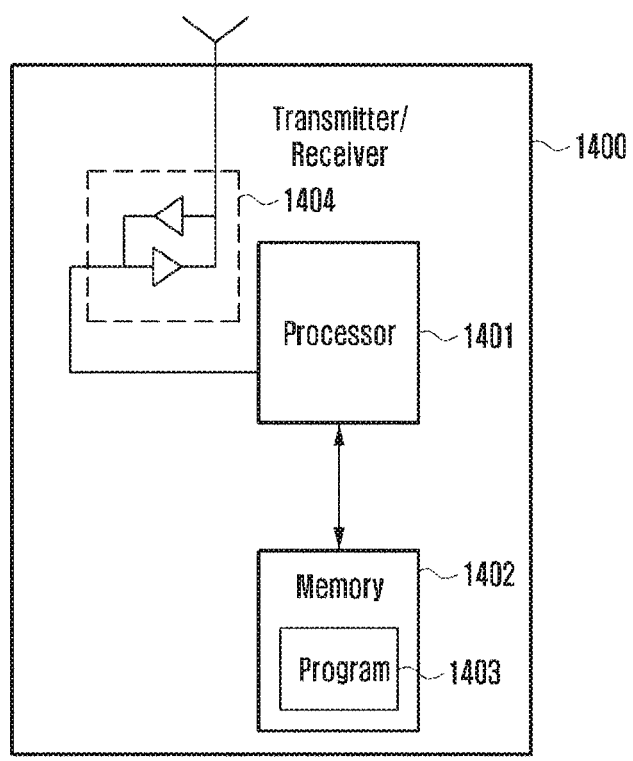
FIG. 14 illustrates a simplified block diagram of an entity of various exemplary embodiments adaptable to implement the present application.

FIG. 14 illustrates a simplified block diagram of an entity 1400 of various exemplary embodiments adaptable to practice the present application. The entity 1400 may be configured to be a base station.

As shown in FIG. 14, the entity 1400 comprises a processor 1401, a memory 1402 coupled to the processor 1401 and a suitable RF transmitter/receiver 1404 coupled to the processor 1401. The memory 1402 stores programs 1403. The transmitter/receiver 1404 is suitable for two-means communication. It should be noted that the transmitter/receiver 1404 has at least one antenna for assisting the communication. The entity 1400 may be coupled to one or more external networks or systems via data paths.

The program 1403 may comprise program commands. When the program commands are executed by associated processor 1401, the entity 1400 operates according to the respective exemplary embodiments of the present application.

The embodiments of the present application may be implemented by computer software which could be executed by the processor 1401 of the entity 1400, or hardware, or the combination of software and hardware.

The memory 1402 may be any appropriate type of memory suitable for local technical environment, and may be achieved by any appropriate data-storage technology, for example, a memory device and system based on semiconductor, a magnetic memory device and system, an optical memory device and system, a fixed memory and a removable memory, which are only some non-restrictive examples. Although only one memory is illustrated in the entity 1400, a plurality of physically independent memory units may be contained by the entity 1400. The processor 1401 may be any appropriate type of processor suitable for local technical environment, and may comprise one or more of the followings: a general-purpose computer, a special-purpose computer, a microprocessor, a digital signal processor (DSP) and a processor based on multi-core architecture, which are only some non-restrictive examples.

In some embodiments, the receiver of the transmitter/receiver 1404 is configured to receive the UE context from the UE; the processor 1401 is configured to control the aforementioned transmitter/receiver 1404, according to the received UE context to perform at least one of optimizing service strategy of the base station, optimizing scheduling mode of the base station and optimizing handover procedure for the UE.

It should be comprehended that, each unit comprised in the entity 1400 is configured to implement the exemplary embodiments disclosed in the present application. Therefore, the above operations and feathers described by combining FIGS. 2 to 12 are also applicable to the entity 1400 and the units therein, and a detailed description thereof is omitted herein.

In addition, there is provided a computer readable storage medium, which may be the computer readable storage medium contained in the source base station, the target base station or the secondary base station in the above embodiments, or a computer readable storage medium individually exists rather than being fitted into any apparatus. There is one or more computer programs stored on the computer readable storage medium, and one or more processors run the one or more computer programs to perform the processing method of the UE context mentioned in the present application.

The above description only refers to the preferred embodiments of the present application and the principles of applied techniques. It will be appreciated by those skilled in the art that, the scope of the claimed solutions as disclosed in the present application are not limited to those consisted of the particularly disclosed combinations of features as described above, but should cover any solutions formed by any combination of features from the foregoing or an equivalence thereof without departing from the inventive concepts, for example, a solution formed by replacing one or more features as discussed in the above with one or more features with similar functions disclosed (but not limited to) in the present application.

The invention claimed is:

1. A method for processing a user equipment (UE) context of a UE by a base station, the method comprising:
   receiving, from the UE, the UE context;
   performing, based on information acquired from the UE context, optimizing a handover procedure for the UE, wherein the optimizing the handover procedure of the UE comprises acquiring location-relevant information in the UE context predicating a location where the UE will be located according to the acquired location-relevant information, and preparing a cell handover context for the UE in advance according to a predicated result and
   performing, based on the information acquired from the UE context, optimizing a scheduling mode of the base station, wherein the optimizing the scheduling mode comprises acquiring location-relevant information in the UE context, predicting a changing Channel Quality Indicator (CQI) trend of the UE according to the location-relevant information, and adjusting a scheduling priority of the UE according to a predicated result.

2. The method according to claim 1, further comprising:
   performing, based on the information acquired from the UE context, optimizing a service strategy of the base station,
   wherein the optimizing the service strategy comprises:
   acquiring equipment-relevant information in the UE context; and
   providing the UE with services corresponding to the equipment-relevant information.

3. The method according to claim 2, wherein the equipment-relevant information comprises screen resolution information; and the providing comprises:
   providing the UE with an air interface radio resource corresponding to a screen resolution of the UE.

4. The method according to claim 1, further comprising:
   performing, based on the information acquired from the UE context, optimizing a service strategy of the base station,
   wherein the optimizing the service strategy comprises:
   acquiring location-relevant information in the UE context;
   predicting, according to the acquired location-relevant information, a location where the UE will be located; and
   performing, according to a predicated result, at least one of:
   buffering traffic data for the UE in advance, or
   optimizing a load balance and an interference coordination process between base stations or between cells.

5. The method according to claim 1,
   wherein the optimizing the scheduling mode further comprises:
   acquiring UE status information in the UE context; and
   adjusting a scheduling priority of the UE according to the acquired UE status information.

6. The method according to claim 5, wherein UE status in the UE status information is a screen active state or a screen inactive state; and
   the adjusting the scheduling priority further comprises:
   increasing the scheduling priority of the UE, if the UE is in the screen active state; or
   decreasing the scheduling priority of the UE, if the UE is in the screen inactive state.

7. The method according to claim 1,
   wherein the optimizing the scheduling mode further comprises:
   acquiring application-relevant information in the UE context; and
   adjusting a scheduling priority of an application of the UE according to the acquired application-relevant information.

8. The method according to claim 7, wherein the application-relevant information comprises at least one of:
   activity information on the application, user preference rank information on the application, traffic request type information on the application, or screen status information on the application in the UE.

9. The method according to claim 1, wherein the adjusting the scheduling priority of the UE according to the predicated result comprises:
   increasing the scheduling priority of the UE, if the predicated result indicates the CQI trend to become worse; or
   decreasing the scheduling priority of the UE, if the predicated result indicates the CQI trend to become better.

10. The method according to claim 1, wherein the base station receives the UE context by one of:
    a newly-added radio resource control (RRC) signaling,
    an enhanced existing RRC signaling,
    a newly-added MAC control element, or
    a newly-added physical layer report.

11. The method according to claim 1, wherein the receiving the UE context from the UE by the base station comprises:
    receiving the UE context from the UE by the base station in accordance with a predetermined mode, wherein the predetermined mode comprises at least one of a periodical mode, an event trigger mode, a single event mode, or a mode required for configuring the UE by the base station.

12. An apparatus for processing a user equipment (UE) context of a UE comprising:
   a transceiver; and
   a processor coupled with the transceiver and configured to control to:
   receive, from the UE, the UE context;
   perform, based on information acquired from the UE context, to optimize a handover procedure for the UE, wherein the processor is configured to optimize the handover procedure of the UE by acquiring location-relevant information in the UE context, predicating a location where the UE will be located according to the acquired location-relevant information, and preparing a cell handover context for the UE in advance according to a predicated result; and
   perform, based on the information acquired from the UE context, to optimize a scheduling mode of a base station, wherein the processor is configured to optimize the scheduling mode by acquiring location-relevant information in the UE context, predicting a changing Channel Quality Indicator (CQI) trend of the UE according to the location-relevant information, and adjusting a scheduling priority of the UE according to a predicated result.

13. The apparatus according to claim 12, wherein the processor is further configured to:
   perform, based on the information acquired from the UE context, to optimize a service strategy of the base station.

* * * * *